US008183314B2

(12) United States Patent
Varadaraj et al.

(10) Patent No.: US 8,183,314 B2
(45) Date of Patent: May 22, 2012

(54) EMULSION COMPOSITIONS WITH A POLYMERIC EMULSIFIER

(75) Inventors: Ramesh Varadaraj, Flemington, NJ (US); Cornelius Hendrick Brons, Easton, PA (US); David John Lohse, Bridgewater, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 319 days.

(21) Appl. No.: 12/459,057

(22) Filed: Jun. 26, 2009

(65) Prior Publication Data

US 2010/0004382 A1    Jan. 7, 2010

Related U.S. Application Data

(60) Provisional application No. 61/133,682, filed on Jul. 1, 2008.

(51) Int. Cl.
*C08F 2/32* (2006.01)
*C08F 214/16* (2006.01)
*C08F 236/16* (2006.01)
*C08L 25/16* (2006.01)
*C08L 9/00* (2006.01)
*C08J 3/215* (2006.01)

(52) U.S. Cl. ........ 524/300; 524/801; 524/851; 524/856; 524/291; 524/340; 523/334

(58) Field of Classification Search .................. 524/300, 524/801, 851, 856; 526/291, 340; 523/334
See application file for complete search history.

(56) References Cited

U.S. PATENT DOCUMENTS

| | | | |
|---|---|---|---|
| 3,438,757 A | 4/1969 | Honnen et al. | |
| 3,565,804 A | 2/1971 | Honnen et al. | |
| 3,574,576 A | 4/1971 | Honnen et al. | |
| 3,898,056 A | 8/1975 | Honnen | |
| 3,960,515 A | 6/1976 | Honnen | |
| 4,832,702 A | 5/1989 | Kummer et al. | |
| 4,911,736 A | 3/1990 | Huang et al. | |
| 5,162,445 A | 11/1992 | Powers et al. | |
| 5,595,723 A | 1/1997 | Quay | |
| 5,654,379 A | 8/1997 | Powers et al. | |
| 5,717,031 A | 2/1998 | Degen et al. | |
| 5,959,049 A | 9/1999 | Powers et al. | |
| 6,103,786 A | 8/2000 | Hoch et al. | |
| 6,462,131 B1 | 10/2002 | Tse et al. | |
| 6,600,076 B1 | 7/2003 | Abbott et al. | |
| 2006/0063844 A1 | 3/2006 | Nagy et al. | |
| 2007/0015853 A1* | 1/2007 | Weng et al. | .................. 523/333 |

OTHER PUBLICATIONS

"Polymer blend morphology by dynamic AFM", Annual Technical Conference of the Society of Plastics Engineers (2001), 59$^{th}$ (vol. 2), 1956-1960.

* cited by examiner

*Primary Examiner* — Michael Pepitone
(74) *Attorney, Agent, or Firm* — Robert A. Migliorini

(57) ABSTRACT

Provided are oil-in-water and water-in-oil emulsion compositions including from 0.01 to 5 wt % of a halogenated elastomer emulsifier, and optionally from to 0.5 wt % of a polyalkylene amine co-emulsifier. The emulsion compositions disclosed herein provide for increased interfacial elasticity and decreased interfacial tension at the oil-water interface to increase resistance to coalescence of dispersed water droplets of a water-in-oil emulsion or oil droplets of an oil-in-water emulsion. The emulsion compositions disclosed herein are suitable for lubricant applications due to their resistance to shear thinning.

22 Claims, 3 Drawing Sheets

70 / 30: Hexane / Water Emulsion Stabilized by
0.1% Brominated Poly (isobutylene-co-para methyl styrene)

70 / 30: Hexane / Water Emulsion Stabilized by
0.1% Brominated Poly (isobutylene-co-para methyl styrene)

70 / 30: Hexane / Water Emulsion Stabilized by
0.1% Brominated Poly (isobutylene-co-para methyl styrene)
and 0.001 wt% Polyisobutylene amine Aggregation of the BIMSM Polymer Molecules at the Hexane-Water Interface

EMULSION COMPOSITIONS WITH A POLYMERIC EMULSIFIER

CROSS-REFERENCE TO RELATED APPLICATIONS

This application claims priority to U.S. Provisional Application Ser. No. 61/133,682 filed Jul. 1, 2008, herein incorporated by reference in its entirety.

FIELD

The present invention relates to the field of emulsions. It more particularly relates to oil-in-water and water-in-oil emulsions. Still more particularly, it relates to oil-in-water and water-in-oil emulsions including a halogenated elastomer emulsifier.

BACKGROUND

Oil-in-water or water-in-oil emulsions often times utilize surfactants to decrease the interfacial tension between the oil and water to help prevent coalescence of water droplets of a water-in-oil emulsion or oil droplets of an oil-in-water emulsion. However, use of surfactants to help prevent coalescence has limitations to the extent to which coalescence of water droplets or oil droplets can be prevented. Surfactant methods use interfacial tension reduction as the means for inhibiting coalescence and stabilizing the emulsion.

Surfactant stabilized oil-in-water or water-in-oil emulsions have various uses including use in lubrication applications. However, the main drawback of an emulsion lubricant is its instability to shear and its shear-thinning characteristics. Lubrication applications involve contact between moving surfaces, and emulsion instability due to shear will result in emulsion break-up and subsequent loss of ability to function as a lubricant. In addition, in lubricant applications coalescence of water droplets of a water-in-oil emulsion or oil droplets of an oil-in-water emulsion may be exacerbated due to shear and shear thinning.

Interfacially active polymers may also stabilize the oil-water interface in emulsions and prevent coalescence by not only decreasing interfacial tension, but also increasing interfacial elasticity. Using polymers to inhibit coalescence may be superior and more robust than the use of surfactants. Suitable polymeric materials for increasing interfacial elasticity in emulsion compositions have been long sought after.

Accordingly, a need exists for emulsion compositions utilizing interfacially active polymers that have reduced tendency for coalescence, and also improved stability to shear and reduced shear-thinning when used in lubrication applications.

SUMMARY

According to the present disclosure, an advantageous emulsion composition comprises an oil component, a water component, and from 0.01 to 5 wt % of a halogenated elastomer emulsifier.

A further aspect of the present disclosure relates to an advantageous method of making an emulsion composition comprising: providing an oil component, a water component, and from 0.01 to 5 wt % of a halogenated elastomer emulsifier, and mixing the oil component, the water component and the halogenated elastomer emulsifier to disperse the oil component or the water component as droplets in the emulsion composition.

These and other features and attributes of the disclosed oil-in-water and water-in-oil emulsions including a halogenated elastomer emulsifier of the present disclosure and their advantageous applications and/or uses will be apparent from the detailed description which follows, particularly when read in conjunction with the figures appended hereto.

BRIEF DESCRIPTION OF DRAWINGS

To assist those of ordinary skill in the relevant art in making and using the subject matter hereof, reference is made to the appended drawings, wherein.

DETAILED DESCRIPTION

Figure 1:
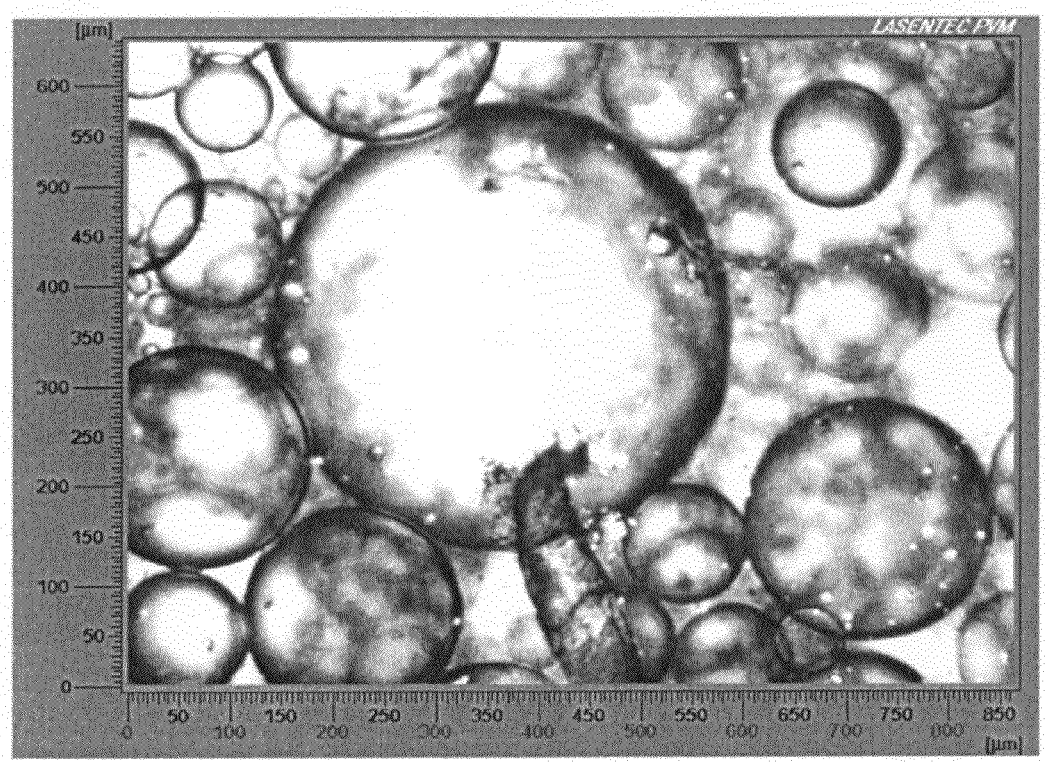
FIG. 1 depicts an optical micrograph of a 70/30: hexane/water emulsion stabilized by 0.1 wt % of brominated poly (isobutylene-co-para methyl styrene).

All numerical values within the detailed description and the claims herein are modified by "about" or "approximately" the indicated value, and take into account experimental error and variations that would be expected by a person having ordinary skill in the art.

As used herein, "emulsion" refers to a system consisting of a liquid or liquid suspension dispersed with or without an emulsifier in an immiscible liquid usually in droplets of larger than colloidal size. The emulsion may include an emulsifier or a surfactant. Emulsions can be characterized by their droplet sizes as macro and micro type emulsions. A macro emulsion has dispersed droplets that are greater than 1 micron in diameter. A micro emulsion has droplet sizes that are less than 1 micron in diameter. An oil-in-water emulsion is one where oil droplets are dispersed in water. A water-in-oil emulsion is one where water droplets are dispersed in oil. An oil-in-water emulsion has water as the continuous phase. A water-in-oil emulsion has oil as the continuous phase.

As used herein, "elastomer" or "elastomeric composition" refers to any polymer or composition of polymers (such as blends of polymers) consistent with the ASTM D1566 definition. Elastomer includes mixed blends of polymers such as those made by melt mixing and/or blending in polymerization reactors. The terms may be used interchangeably with the term "rubber." As used herein, "isobutylene based elastomer" or "isobutylene based polymer" refers to elastomers or polymers comprising at least 70 mole percent repeat units from isobutylene. As used herein, "phr" is 'parts per hundred rubber' and is a measure common in the art wherein components of a composition are measured relative to a major elastomer component, based upon 100 parts by weight of the elastomer(s) or rubber(s).

The present disclosure provides novel water-in-oil and oil-in-water emulsion compositions and methods for making such compositions. The emulsion compositions are distinguishable over the prior art in that they include a novel interfacially active polymeric emulsion stabilizer (also referred to as an emulsifier) that is a halogenated elastomer, more preferably a halogenated isobutylene based elastomer, and still more preferably a brominated poly (isobutylene-co-para methyl styrene) elastomer. It has been discovered that a halogenated elastomer emulsion stabilizer decreases the interfacial tension and/or increases interfacial elasticity at the oil-water interface to increase the resistance to coalescence of dispersed water droplets of a water-in-oil emulsion or oil droplets of an oil-in-water emulsion. This may be advantageous in lubricant compositions where shear thinning increases the tendency for conventional emulsions to coalesce.

In addition, it has been discovered that a halogenated elastomer emulsion stabilizer may be used in combination with a polyalkylene amine co-emulsion stabilizer (also referred to as a co-emulsifier) to produce a synergistic effect to further increase the oil-water interface elasticity to inhibit coalescence. The emulsion compositions and methods of making the emulsion compositions including halogenated elastomers of the present disclosure offer significant advantages relative to prior art compositions and methods of making, and in particular for use in lubricants. The advantageous properties and/or characteristics of the disclosed emulsion compositions and methods of making are based, at least in part, on increasing the interfacial elasticity between oil and water, which in turn reduces the tendency for coalescence of droplets.

The oil-in-water emulsions of the present disclosure are characterized by an oil component at concentrations ranging from 2 to 50 wt %. The lower limit of the oil component concentration may be 2, 5, 10, 15, 20, or 25 wt % and the upper limit of the oil component concentration may be 25, 30, 35, 45, or 50 wt %. The water-oil emulsions of the present disclosure are characterized by water component concentrations ranging from 5 to 50 wt %. The lower limit of the water component concentration may be 5, 10, 15, 20, or 25 wt %. The upper limit of the water component concentration may be 25, 30, 35, 40, 45, or 50 wt %.

In one form of the present disclosure, an oil-in-water emulsion or water-in-oil emulsion includes from 0.01 wt % to 5 wt % of a halogenated elastomer emulsifier. The lower limit of the halogenated elastomer emulsifier may be 0.01, 0.02, 0.05, 0.07, 0.1, 0.2, 0.5, 0.7, 1.0, 1.2, 1.5, or 2.0 wt %. The upper limit of the halogenated elastomer emulsifier may be 2.5, 3.0, 3.5, 4.0, 4.5, or 5.0 wt %.

In another form of the present disclosure, an oil-in-water emulsion or water-in-oil emulsion includes, not only from 0.01 wt % to 5 wt % of a halogenated elastomer emulsifier, but also from 0.0005 wt % to 0.5 wt % of a polyalkylene amine co-emulsifier. The lower limit of the polyalkylene amine co-emulsifier may be 0.0005, 0.001, 0.002, 0.005, 0.007, 0.01, 0.02, 0.05, 0.07, 0.1, 0.12, 0.15, or 0.2 wt %. The upper limit of the polyalkylene amine co-emulsifier may be 0.25, 0.30, 0.35, 0.40, 0.45, or 0.50 wt %.

In one form of the present disclosure, when a halogenated elastomer emulsifier and optional polyalkylene amine co-emulsifier are included in an oil-in-water emulsion, the emulsion may include from 2 to 50 wt % of the oil emulsion component. The lower limit of the oil emulsion component may be 2, 4, 6, 8, 10, 15 or 20 wt %. The upper limit of the oil emulsion component may be 25, 30, 35, 40, 45 or 50 wt %.

In another form of the present disclosure, when a halogenated elastomer emulsifier and optional polyalkylene amine co-emulsifier are included in a water-in-oil emulsion, the emulsion may include from 2 to 50 wt % of the water emulsion component. The lower limit of the water emulsion component may be 2, 4, 6, 8, 10, 15 or 20 wt %. The upper limit of the water emulsion component may be 25, 30, 35, 40, 45 or 50 wt %.

Below is a description of the range of oil emulsion components, water emulsion components, halogenated elastomer emulsifier, and optional polyalkylene amine co-emulsifier that may be included in the oil-in-water emulsions and water-in-oil emulsions of the present disclosure.

Oil Emulsion Component:

The oil useful for the oil emulsion component may be vegetable oil, crude oil, crude oil distillate, lubricant base stock, asphaltic oil, synthetic hydrocarbon oil (such as polyalphaolefins), synthetic silicone oil and mixtures thereof. In the instant disclosure, the preferred oil emulsion component is a hydrocarbon. The hydrocarbon of the emulsion composition of the instant disclosure is any hydrocarbon boiling in the range of 30° F. (−1.1° C.) to 1050° F. (565.6° C.), preferably 50° F. (10° C.) to 380° F. (193° C.). Hydrocarbons suitable for the emulsion can be obtained from crude oil refining processes known to the skilled artisan. Low sulfur gasoline, naphtha, diesel fuel, jet fuel, kerosene are non-limiting examples of hydrocarbons that can be utilized to prepare the emulsion of the instant invention. A Fisher-Tropsch derived paraffin fuel boiling in the range between 30° F. (−1.1° C.) and 700° F. (371° C.) and, more preferably, a naphtha comprising $C_5$-$C_{10}$ hydrocarbons can also be used. One preferred $C_5$-$C_{10}$ hydrocarbon is hexane.

Water Emulsion Component:

The water emulsion component may be distilled water, or it may be water that includes chlorides, sulfates, and carbonates of Group IA, Group IIA, and mixtures of Group IA and IIA. Hence brine produced at a well site is suitable as the water emulsion component. Water-alcohol mixtures can also be used. Low molecular weight alcohols selected from the group consisting of methanol, ethanol, normal and iso-propanol, normal, iso and secondary-butanol, ethylene glycol, propylene glycol, butylene glycol and mixtures thereof are preferred. The ratio of water:alcohol can vary from about 99.1:0.1 to about 20:80, preferably 90:10 to 70:30. The water component may also optionally include HBr. In one form of the present disclosure, the water component includes 0.1M HBr.

Halogenated Elastomer Emulsifier Component:

The halogenated elastomer emulsifier component of the present invention includes at least one halogenated elastomer comprising $C_4$ to $C_7$ isoolefin derived units. The isoolefin may be a $C_4$ to $C_8$ compound, in one embodiment selected from isobutylene, 2-methyl-1-butene, 3-methyl-1-butene, 2-methyl-2-butene, and 4-methyl-1-pentene. The elastomer may also include other monomer derived units. In one embodiment, the halogenated elastomer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the elastomer includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-falvene, hexadiene, cyclopentadiene, methylcyclopentadiene, and piperylene.

In one embodiment, the halogenated elastomer includes an isoolefin derived unit, a multiolefin derived unit, and a styrenic derived unit. In another embodiment, the halogenated elastomer includes an isoolefin derived unit and a styrenic derived unit, and in yet another embodiment the halogenated elastomer includes an isoolefin derived unit and a multiolefin derived unit.

The halogenated elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the disclosure, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units statistically spaced along the polymer chain:

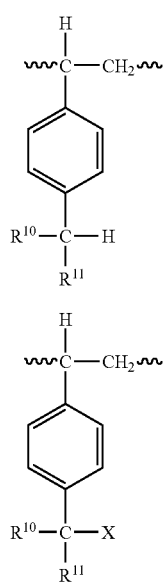

(4)

(5)

wherein $R^{10}$ and $R^{11}$ are independently hydrogen, lower alkyl, preferably $C_1$ to $C_7$ alkyl and primary or secondary alkyl halides and X is a functional group such as halogen. Preferably $R^{10}$ and $R^{11}$ are hydrogen. Up to 60 mole percent of the para-substituted styrene present in the interpolymer structure may be the functionalized structure (5) above in one embodiment, and in another embodiment from 0.1 to 5 mole percent of all monomer repeat units. In yet another embodiment, the amount of functionalized structure (5) is from 0.4 to 1 mole percent of all monomer repeat units.

The functional group X may be halogen or a combination of a halogen and some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, herein incorporated by reference, and in particular, the functionalized amines as described below.

Most useful of such functionalized materials are elastomeric random interpolymers of isobutylene and para-methylstyrene containing from 0.5 to 20 mole percent para-methylstyrene, wherein up to 60 mole percent of the methyl substituent groups present on the benzyl ring contain a bromine or chlorine atom, preferably a bromine atom (para(bromomethylstyrene)), as well as a combination of para(bromomethylstyrene) and other functional groups such as ester and ether. These halogenated elastomers are commercially available as EXXPRO® Elastomers (ExxonMobil Chemical Company, Houston Tex.), and referred to as a brominated poly (isobutylene-co-para methyl styrene), which may be abbreviated as "BIMSM".

In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a para-alkylstyrene content within 10% of the average para-alkylstyrene content of the polymer, as measured by the procedure described in U.S. Pat. No. 5,162,445, herein incorporated by reference. Desirable interpolymers are also characterized by a narrow molecular weight distribution (Mw/Mn) of less than 5, more preferably less than 2.5, a preferred viscosity average molecular weight in the range of from 200,000 g/mol up to 2,000,000 g/mol and a preferred number average molecular weight in the range of from 25,000 g/mol to 750,000 g/mol as determined by gel permeation chromatography.

The BIMSM polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMSM polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 15 weight percent based on the total weight of the polymer in one embodiment, and from 4 weight percent to 10 weight percent in another embodiment. In another embodiment, the para-(halomethylstyrene) is para-(bromomethylstyrene).

Optional Polyalkylene Amine Co-Emulsifier Component:

The optional polyalkylene amine co-emulsifier component may be a straight or branched chain amine having at least one basic nitrogen atom wherein the polyalkylene group has a number average molecular weight of about 600 g/mol to about 3,000 g/mol. Preferably, the polyalkylene group will have a number average molecular weight in the range of about 750 g/mol to about 2,200 g/mol, and more preferably, in the range of about 900 g/mol to about 1,500 g/mol.

The polyalkylene group will be relatively free of aliphatic unsaturation, i.e., ethylenic and acetylenic, particularly acetylenic unsaturation. The polyalkylene group will generally be a branched chain. When employing a branched-chain polyalkylene amine, the polyalkylene group is preferably derived from polymers of $C_2$ to $C_6$ olefins, more preferably isobutylene.

The amine component of the polyalkylene amines may be derived from ammonia, a monoamine or a polyamine. The monoamine or polyamine component embodies a broad class of amines having from 1 to about 12 amine nitrogen atoms and from 1 to about 40 carbon atoms, preferably with a carbon to nitrogen ratio between about 1:1 and 10:1. Generally, the polyamine will contain from 2 to about 12 amine nitrogen atoms and from 2 to about 40 carbon atoms. In most instances, the amine component is not a pure single product, but rather a mixture of compounds having a major quantity of the designated amine.

The monoamines preferably are primary or secondary monoamines which contain 1 nitrogen atom and 1 to about 100 carbon atoms, preferably 30 to about 70 carbon atoms. The primary or secondary monoamine may also contain one or more oxygen atoms.

Preferred polyalkylene amines suitable for use in the present invention are polyalkylene amines having the following formula: $R_3NH$—(—$CH_2CHR_2NH$—)$_n$—$R_4$, wherein $R_2$ may be hydrogen, $C_1$ to $C_6$ alkyl groups, and combinations thereof. "n" may range from 0 to 50, and preferably 0 to 40. $R_3$ is polyalkenyl radical having a number average molecular weight of about 600 g/mol to about 3,000 g/mol. $R_4$ is H or a polyalkylene radical having a molecular weight of about 600 g/mol to 3,000 g/mol. Preferably, $R_3$ is a polyalkenyl radical having a molecular weight of about 750 g/mol to about 2,200 g/mol, more preferably, from about 900 g/mol to about 1,500 g/mol. Preferably $R_4$ is H or a polyalkenyl radical having a molecular weight of about 750 g/mol to about 2,200 g/mol, more preferably, from about 900 g/mol to about 1,500 g/mol. Particularly preferred branched-chain polyalkylene amines include polyisobutenyl ethylene diamine and polyisobutylene amine (also referred to herein as PIB-Amine or PIBA), wherein the polyisobutylene group is substantially saturated.

Where the amine is a polyamine, the polyamine may optionally be substituted in addition to the above-mentioned polyalkenyl radical-substitution. In such a substituted polyamine, the substituents are found at any atom capable of receiving them. The substituted atoms, e.g., substituted nitrogen atoms, are generally geometrically unequivalent. Consequently, the substituted amines finding use as co-emulsifiers in the present invention can be mixtures of mono- and poly-substituted polyamines with substituent groups situated at equivalent and/or unequivalent atoms. Typically, the optional substituent is at least one substituent selected from the group consisting of: (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower" as used in terms like lower alkyl or lower alkoxy, means a group containing from 1 to about 6 carbon atoms. At least one of the substituents on one of the basic nitrogen atoms of the polyamine is hydrogen, e.g., at least one of the basic nitrogen atoms of the polyamine is a primary or secondary amino nitrogen. The monoamines can have optional substitution.

The optional polyalkylene amine and polyalkylene substituted amine co-emulsifier components of the present invention are prepared by conventional procedures known in the art. Such polyalkylene substituted amines and their preparations are described in detail in U.S. Pat. Nos. 3,438,757; 3,565,804; 3,574,576; 3,898,056; 3,960,515; and 4,832,702, the disclosures of which are incorporated herein by reference. More particularly, polyisobutylene amines obtained via chlorination of polyisobutene and subsequent reaction with mono- or polyamines is disclosed in U.S. Pat. No. 3,438,757. Polyisobutylene amines may be obtained via hydroformylation of reactive polyisobutene to give polyisobutyl alcohol and subsequent reductive amination with ammonia to polyisobutyl amine. Particularly preferred branched-chain polyalkylene amines include polyisobutenyl ethylene diamine and polyisobutyl amine, wherein the polyisobutyl group is substantially saturated. An exemplary polyisobutyl amine (PIBA) is KEROCOM PIBA 03 produced by BASF.

Interfacial Properties:

The decreased interfacial tension and/or the increased interfacial elasticity of the disclosed emulsion compositions provides for increased resistance to coalescence of the dispersed water droplets of a water-in-oil emulsion or oil droplets of an oil-in-water emulsion.

In one form, the oil-in-water and water-in-oil emulsions including a halogenated elastomer emulsifier of the present disclosure are characterized by interfacial tensions of the oil-water interface as measured using a pendant drop interfacial tensiometer (see below) ranging from 10 to 55 dynes/cm. The lower limit of the interfacial tension may be 10, 15, 20, or 25 dynes/cm. The upper limit of the interfacial tension may be 35, 45, 50 or 55 dynes/cm. In another form, the oil-in-water and water-in-oil emulsions including a halogenated elastomer emulsifier of the present disclosure are characterized by an interfacial tension of the oil-water interface as measured using a pendant drop interfacial tensiometer of less than or equal to 55 dynes/cm.

In one form, the oil-in-water and water-in-oil emulsions including a combination of a halogenated elastomer emulsifier and a polyalkylene amine co-emulsifier of the present disclosure are characterized by an interfacial tension of the oil-water interface as measured using a pendant drop interfacial tensiometer ranging from 0.1 to 25 dynes/cm. The lower limit of the interfacial tension may be 0.1, 0.3, 0.5, 0.7, 0.9, 1.1, 1.3, or 1.5 dynes/cm. The upper limit of the interfacial tension may be 2.0, 5.0, 10.0, 15.0, 20.0, or 25.0 dynes/cm. In another form, the oil-in-water and water-in-oil emulsions including a combination of a halogenated elastomer emulsifier and a polyalkylene amine co-emulsifier of the present disclosure are characterized by an interfacial tension of the oil-water interface as measured using a pendant drop interfacial tensiometer of less than or equal to 25 dynes/cm.

In one form, the oil-in-water and water-in-oil emulsions including a halogenated elastomer emulsifier of the present disclosure are characterized by an interfacial elasticity of the oil-water interface as measured using an oscillatory tensiometer (see below) ranging from 10 to 36 mN/m. The lower limit of the interfacial elasticity may be 10, 12, 14, 16, 18, 20, or 22 mN/m. The upper limit of the interfacial elasticity may be 24, 26, 28, 30, 32, 34 or 36 mN/m. In another form, the oil-in-water and water-in-oil emulsions including a halogenated elastomer emulsifier of the present disclosure are characterized by an interfacial elasticity of the oil-water interface as measured using an oscillatory tensiometer ranging from 10 to 75 mN/m. In this form, the upper limit of the interfacial elasticity may be 40, 45, 50, 55, 60, 65, 70, or 75 mN/m. In yet another form, the oil-in-water and water-in-oil emulsions including a halogenated elastomer emulsifier of the present disclosure are characterized by an interfacial elasticity of the oil-water interface as measured using an oscillatory tensiometer greater than or equal to 10 mN/m.

In one form, the oil-in-water and water-in-oil emulsions including a combination of a halogenated elastomer emulsifier and a polyalkylene amine co-emulsifier of the present disclosure are characterized by an interfacial elasticity of the oil-water interface as measured using an oscillatory tensiometer ranging from 20 to 50 mN/m. The lower limit of the interfacial elasticity may be 20, 22, 24, 26, 28, 30, 32, or 34 mN/m. The upper limit of the interfacial elasticity may be 36, 38, 40, 42, 44, 46, 48, or 50 mN/m. In another form, the oil-in-water and water-in-oil emulsions including a combination of a halogenated elastomer emulsifier and a polyalkylene amine co-emulsifier of the present disclosure are characterized by an interfacial elasticity of the oil-water interface as measured using an oscillatory tensiometer ranging from 20 to 100 mN/m. In this form, the upper limit of the interfacial elasticity may be 55, 60, 65, 70, 75, 80, 85, 90, 95 or 100 mN/m. In yet another form, the oil-in-water and water-in-oil emulsions including a combination of a halogenated elastomer emulsifier and a polyalkylene amine co-emulsifier of the present disclosure are characterized by an interfacial elasticity of the oil-water interface as measured using an oscillatory tensiometer greater than or equal to 20 mN/m.

Methods of Making:

The emulsions including a halogenated elastomer emulsifier disclosed herein may be made by methods known to those skilled in the art. More particularly, the emulsions can be prepared by mixing an oil component, a water component, and a halogenated elastomer emulsifier under appropriate mixing conditions to disperse the oil component or the water component as droplets in the emulsion composition. When using a polyalkylene amine co-emulsifier, a mixture of the emulsifier and co-emulsifier may be formed prior to mixing with oil and water components. The mixture of the emulsifier and co-emulsifier may then be added to the oil and water components followed by mixing to disperse the components in the mixture. Another method to form the emulsion compositions with the co-emulsifier disclosed herein is to first mix required amounts of oil and water with a halogenated elastomer and then to add the polyalkylene amine co-emulsifier, and to thereafter mix all the components. In-line mixers, static mixers, sonicators, and combinations thereof are some non-limiting examples of means to provide mixing. Mixing times may range from 1 minute to 5 hours.

Advantages and Applications:

The advantages of the disclosed emulsions including a halogenated elastomer emulsifier and an optional polyalkylene amine co-emulsifier include, inter alia, improved stability, and in particular, improved stability to shear and reduced tendency for shear thinning. Another advantage of the disclosed emulsions including a halogenated elastomer emulsifier and an optional polyalkylene amine co-emulsifier is improved control of the droplet size distribution of the oil droplets for an oil-in-water emulsion and the water droplets for a water-in-oil emulsion.

The oil-in-water and water-in-oil emulsions including a halogenated elastomer emulsifier and an optional polyalkylene amine co-emulsifier of the present disclosure described herein may be utilized in lubricant applications where coalescence of water droplets of a water-in-oil emulsion or oil droplets of an oil-in-water emulsion may be exacerbated due to shear and shear thinning. The emulsion compositions disclosed herein provide for decreased interfacial tension and/or increased interfacial elasticity at the oil-water interface to increase the resistance to coalescence of dispersed water droplets of a water-in-oil emulsion or oil droplets of an oil-in-water emulsion.

Test Methods

The determination of interfacial elasticity at the water-in-oil interface was made using an oscillatory tensiometry, a well known technique in the art of interfacial elasticity measurement. A modified TECLIS oscillatory rheometer was used for such determination.

The determination of interfacial tension is a well known technique in the art of interfacial tension measurement. A pendant drop interfacial tensiometer was used for such determination.

The determination of resistance to coalescence of dispersed water droplets in a water-in-oil emulsion was made using video microscopy. A LASENTEC video microscope was used for such a determination.

EXAMPLES

A 70 wt % hexane (oil component) and 30 wt % water (water component) water-in-oil emulsion was prepared. A second 70 wt % hexane (oil component) and 30 wt % water (water component) emulsion was prepared that also included 0.1 wt % BIMSM1 [brominated poly (isobutylene-co-para methyl styrene) with 90 wt % isobutylene, 10 wt % paramethyl styrene, 0.85 mol % benzylic bromine, Mooney viscosity (ML (1+8) @ 125° C.) of 32 available from ExxonMobil Chemical Co.] as an emulsifier component. A third 70 wt % hexane (oil component) and 30 wt % water (water component) emulsion was prepared that included 0.1 wt % BIMSM1 as an emulsifier component and 0.01M (0.001 wt %) PIB amine (KEROCOM PIBA 03 produced by BASF) as a co-emulsifier component.

Using the oscillatory tensiometer, the interfacial elasticity of the hexane-water interface of the 70/30 hexane/water emulsion was measured to be 9 mN/m. When 0.1 wt % BIMSM1 in hexane was used as the oil phase, the hexane-water interfacial elasticity increased to 19 mN/m. This increased interface elasticity increases the resistance to coalescence of the dispersed water droplets of a water-in-oil emulsion or oil droplets of an oil-in-water emulsion. Hence, it has been discovered that brominated poly (isobutylene-co-para methyl styrene) has unique interfacial properties at the hexane-water interface of a water-in-oil emulsion that makes it an interfacially active polymeric stabilizer of the oil-water interface.

In addition, when 0.001 wt % PIB amine co-emulsifier was added to the 70 wt % hexane/30 wt % water emulsion containing 0.1 wt % BIMSM1, the interfacial elasticity of the interface increased to 37 mN/m. The increase in interfacial elasticity from 19 mN/m to 37 mN/m indicates that brominated poly (isobutylene-co-para methyl styrene), and PIB-amine act synergistically at the hexane-water interface to increase its elasticity. This observation of synergism with PIB-amine is an added attribute of the brominated poly (isobutylene-co-para methyl styrene) polymer. Polymer-surfactant synergism at oil-water interfaces is difficult to achieve and the fact that such a synergism was discovered in the brominated poly (isobutylene-co-para methyl styrene)-PIB amine combination further adds to the attributes of the instant invention.

In order to test the water-oil interfacial stabilization property, the 70 wt % hexane/30 wt % water emulsion with 0.1 wt % BIMSM1 as an emulsifier component was examined using an in situ video microscope. FIG. 1 depicts one representative frame of the water-in-oil emulsion as viewed by the video microscope. It is notable that the water droplets are dispersed in the hexane. More particularly, the water droplets are in contact with each other, but do not coalesce with each other. Even upon shearing the 70 wt % hexane/30 wt % water emulsion with 0.1 wt % BIMSM1 at 300 rpm, no coalescence of the water droplets was observed. The improved resistance to coalescence relative to a 70 wt % hexane/30 wt % water emulsion with no halogenated elastomer may be attributed to the elastic nature of the hexane-water interface due to brominated poly (isobutylene-co-para methyl styrene) molecules at the interface.

Figure 2:
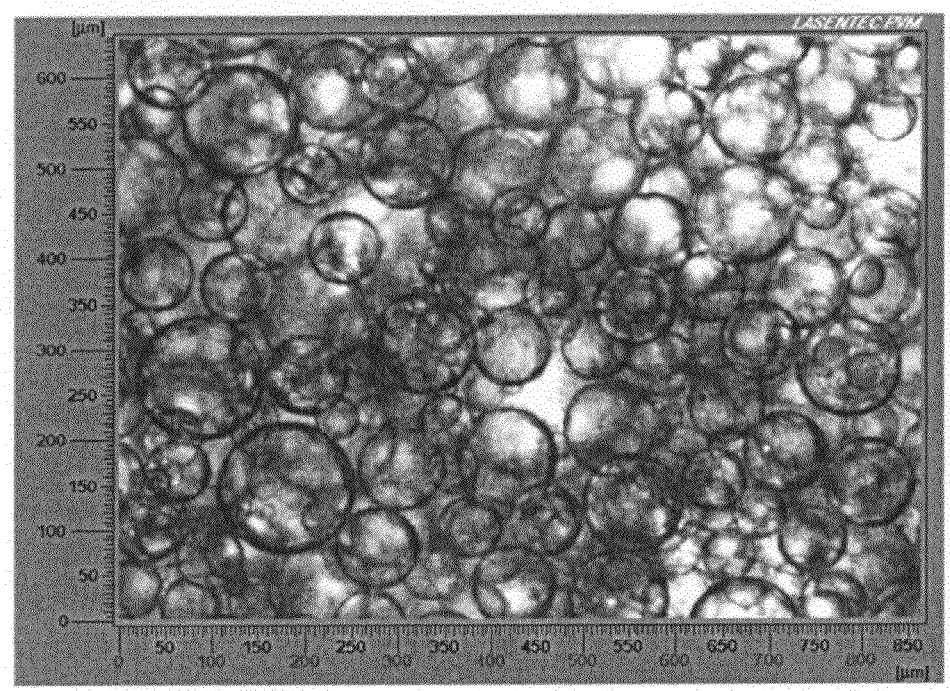
FIG. 2 depicts an optical micrograph of a 70/30: hexane/water emulsion stabilized by 0.1 wt % of brominated poly (isobutylene-co-para methyl styrene) and 0.001 wt % polyisobutylene amine.

In a further test of the water-oil interfacial stabilization property, 0.001 wt % PIB amine was added to the 70 wt % hexane/30 wt % water emulsion with 0.1 wt % BIMSM1 and the water-in-oil emulsion was further examined under the video microscope. FIG. 2 depicts one representative frame of the emulsion as viewed by the video microscope. It is notable that there is a change in the dispersed water droplet size distribution with addition of the PIB amine. Smaller dispersed water droplets are observed in FIG. 2 (PIB amine) relative to FIG. 1 (no PIB amine). The droplets are in close contact with each other, but again do not coalesce. Even upon shearing the 70 wt % hexane/30 wt % water emulsion with 0.1 wt % BIMSM1 and 0.001 wt % PIB amine at 300 rpm, no coalescence of the water droplets was observed. This also supports the discovered synergism between brominated poly (isobutylene-co-para methyl styrene) polymer and PIB-amine as emulsifiers in water-in-oil emulsions and oil-in-water emulsions.

Figure 3:
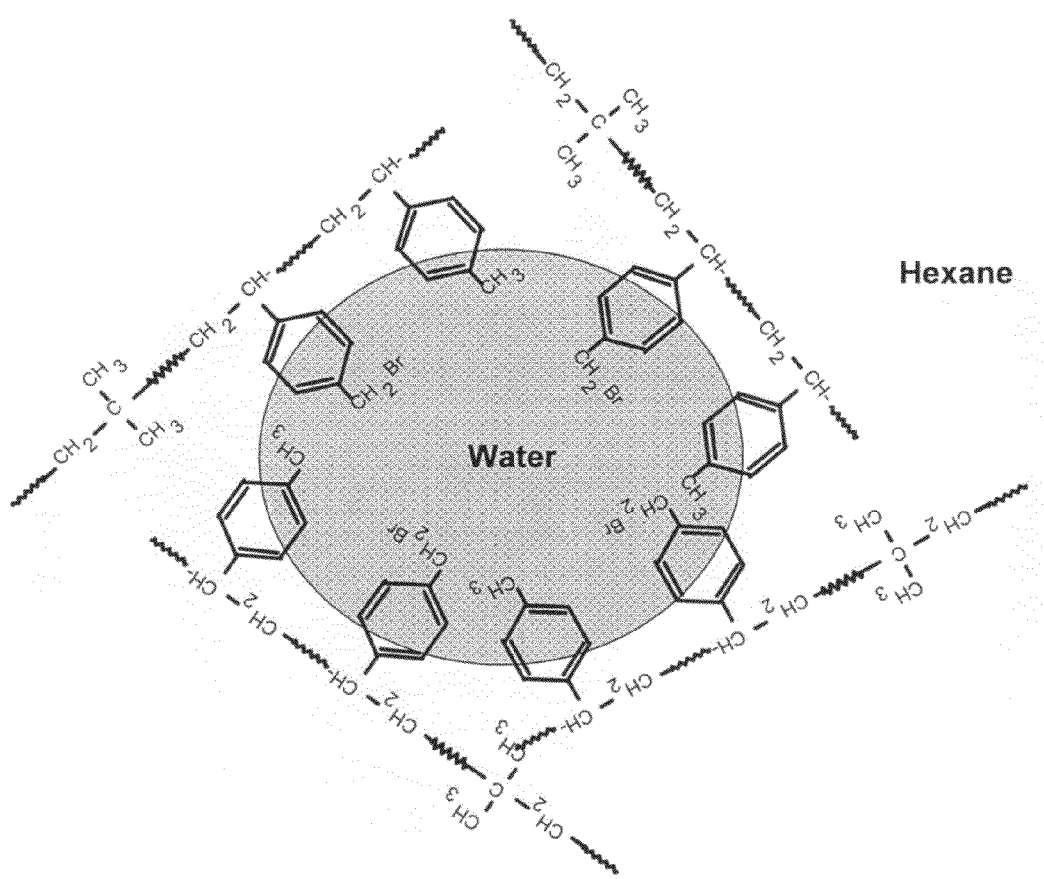
FIG. 3 depicts an illustrative pictorial representation of the aggregation of the brominated poly (isobutylene-co-para methyl styrene) polymer molecules at the hexane-water interface.

The interfacial tensions at the hexane-water interface, wherein the water component contained 0.1M HBr, was measured using the interfacial tensiometer technique described above. Interfacial tension data is presented in the table below. The results indicate that the hexane-water interface in the presence of brominated poly (isobutylene-co-para methyl styrene) polymer exhibits interfacial tension corresponding to a toluene-water interface. This finding indicates the brominated poly (isobutylene-co-para methyl styrene) polymer molecules are surface active and suggests that they aggregate at the hexane-water interface such that the aromatic groups of the brominated poly (isobutylene-co-para methyl styrene) polymer are present at the hexane-water interface and the alkyl chain is solubilized in the hexane phase. An illustrative pictorial representation of the aggregation of the brominated poly (isobutylene-co-para methyl styrene) polymer molecules at the hexane-water interface is shown in FIG. 3. The data also suggests that PIB-amine decreases the interfacial tension at the hexane-water interface, and that the combination of BIMSM and PIB-amine also yields low interfacial tensions at the hexane-water interface. Hence, the emulsion compositions disclosed herein provide for decreased interfacial tension at the oil-water interface to increase resistance to coalescence of dispersed water droplets of a water-in-oil emulsion or oil droplets of an oil-in-water emulsion.

TABLE

Interfacial Tension Data

| Organic phase | Interfacial tension (dynes/cm) |
| --- | --- |
| N-hexane/0.1M HBr in water | 64 |
| Iso-hexane/0.1M HBr in water | 60 |
| Toluene/0.1M HBr in water | 32 |
| Hexane/0.1 wt % BIMSM1/0.1M HBr in water | 31 |
| Hexane/0.001 wt % PIB-amine/0.1M HBr in water | 0.9 |
| Hexane/0.1 wt % BIMSM1/0.001 wt % PIB-amine/0.1M HBr in water | 1.8 |

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. An emulsion composition comprising an oil component, a water component, from 0.0005 to 0.5 wt % of a polyalkylene amine co-emulsifier and from 0.01 to 5 wt % of a halogenated elastomer emulsifier,
   wherein the polyalkylene amine co-emulsifier is a straight or branched chain amine having at least one basic nitrogen atom and a number average molecular weight of about 600 g/mol to about 3,000 g/mol, and
   wherein the water component includes 0.1M HBr.

2. The emulsion composition of claim 1 wherein the oil component is chosen from vegetable oil, crude oil, crude oil distillate, lubricant base stock, asphaltic oil, synthetic hydrocarbon oil, synthetic silicone oil, and mixtures thereof.

3. The emulsion composition of claim 1, wherein the oil component is a $C_5$-$C_{10}$ hydrocarbon.

4. The emulsion composition of claim 3 wherein the $C_5$-$C_{10}$ hydrocarbon is hexane.

5. The emulsion composition of claim 1 wherein the water component is chosen from distilled water, water including chlorides, sulfates and carbonates of Group IA, or Group IIA elements of the periodic table of elements, and mixtures thereof.

6. The emulsion composition of claim 1 wherein the halogenated elastomer emulsifier includes at least one $C_4$ to $C_7$ isoolefin derived unit chosen from isobutylene, isobutene, 2-methyl-1-butene, 3-methyl-1-butene, 2-methyl-2-butene, and 4-methyl-1-pentene.

7. The emulsion composition of claim 6 wherein the halogenated elastomer emulsifier further includes at least one styrenic derived unit chosen from styrene, α-methylstyrene, and alkylstyrene, wherein the alkyl is chosen from a $C_1$ to $C_5$ alkyl and a branched chain alkyl.

8. The emulsion composition of claim 7 wherein the halogenated elastomer emulsifier further includes at least one $C_4$ to $C_{14}$ diene multiolefin derived unit chosen from isoprene, butadiene, 2,3-dimethyl-1,3-butadiene, myrcene, 6,6-dimethyl-falvene, hexadiene, cyclopentadiene, methylcyclopentadiene, and piperylene.

9. The emulsion composition of claim 1 wherein the halogenated elastomer emulsifier is brominated poly (isobutylene-co-para methyl styrene).

10. The emulsion composition of claim 1 wherein the branched chain polyalkylene amine co-emulsifier is polyisobutenyl ethylene diamine or polyisobutylene amine.

11. The emulsion composition of claim 1 wherein the composition is an oil-in-water emulsion including from 5 to 50 wt % of the oil component.

12. The emulsion composition of claim 1 wherein the composition is a water-in-oil emulsion including from 5 to 50 wt % of the water component.

13. The emulsion composition of claim 1 wherein the interfacial elasticity as measured with an oscillatory tensiometer ranges from 10 to 75 mN/m.

14. The emulsion composition of claim 1 wherein the interfacial elasticity as measured with an oscillatory tensiometer ranges from 20 to 100 mN/m.

15. The emulsion composition of claim 1 wherein the interfacial tension as measured with an interfacial tensiometer ranges from 10 to 55 dynes/cm.

16. The emulsion composition of claim 1 wherein the interfacial tension as measured with an interfacial tensiometer ranges from 0.1 to 25 dynes/cm.

17. The emulsion composition of claim 11 wherein the dispersed oil droplets do not coalesce upon shearing.

18. The emulsion composition of claim 12 wherein the dispersed water droplets do not coalesce upon shearing.

19. A lubricant comprising the emulsion composition of claim 1.

20. A method of making an emulsion composition comprising:
   providing an oil component, a water component, from 0.0005 to 0.5 wt % of a polyalkylene amine co-emulsifier and from 0.01 to 5 wt % of a halogenated elastomer emulsifier, and
   mixing the oil component, the water component, the polyalkylene amine co-emulsifier and the halogenated elastomer emulsifier to disperse the oil component or the water component as droplets in the emulsion composition
      wherein the polyalkylene amine co-emulsifier is a straight or branched chain amine having at least one basic nitrogen atom and a number average molecular weight of about 600 g/mol to about 3,000 g/mol, and
   wherein the water component includes 0.1M HBr.

21. The method of claim 20 wherein the mixing is conducted by an in-line mixer, static paddle mixer, sonicator or combinations thereof.

22. The method of claim 21 wherein the mixing is conducted for a time period in the range of 1 minute to 5 hours.

* * * * *